US012776100B1

(12) United States Patent
Umar et al.

(10) Patent No.: US 12,776,100 B1
(45) Date of Patent: Oct. 27, 2026

(54) DYNAMIC GENERATION AND RENDERING OF CUSTOM VIRTUAL ASSETS IN A STATE-BASED EXTENDED REALITY JOURNEY THROUGH A PHYSICAL SPACE

(71) Applicant: FMR LLC, Boston, MA (US)

(72) Inventors: Erich Umar, Kittery, ME (US); Seth Warren Brooks, Westwood, MA (US); David Martin, Natick, MA (US); Hangyu Wang, Cary, NC (US); Tanya Sharko Courcey, Boston, MA (US); Thomas McGuire, Claregalway (IE)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 19/411,733

(22) Filed: Dec. 8, 2025

(51) Int. Cl.
*G06T 17/00* (2006.01)
*G02B 27/01* (2006.01)
*G06F 3/01* (2006.01)
*G06T 19/00* (2011.01)

(52) U.S. Cl.
CPC ............ *G06T 17/00* (2013.01); *G02B 27/017* (2013.01); *G06F 3/012* (2013.01); *G06F 3/013* (2013.01); *G06T 19/006* (2013.01)

(58) Field of Classification Search
None
See application file for complete search history.

(56) References Cited

U.S. PATENT DOCUMENTS 10,853,647 B2 12/2020 Smith et al.
11,328,491 B2 5/2022 Weinheimer et al.
11,556,961 B2 1/2023 Zavesky et al.
11,612,817 B1 3/2023 McCain et al.
11,676,345 B1 6/2023 Bhushan et al.
11,699,268 B1 7/2023 Bhushan et al.
(Continued)

FOREIGN PATENT DOCUMENTS

WO 2005015345 A2 2/2005
WO 2024253782 A1 12/2024

OTHER PUBLICATIONS

Seo, Byung-Kuk, Hye Sun Park, and Yong Sun Kim. "AlterVerse: A framework for interactive virtual altering of physical objects in extended reality environments." IEEE Computer Graphics and Applications 44.5 (2024): 76-84. (Year: 2024).*

*Primary Examiner* — Daniel F Hajnik
(74) *Attorney, Agent, or Firm* — Cesari and McKenna, LLP

(57) ABSTRACT

Methods and apparatuses for dynamically generating and rendering custom virtual assets in a state-based XR journey through a physical space include a server computing device that identifies an XR headset device worn by a user and a physical environment in which the XR headset is located. The server generates a user-specific virtual experience based upon one or more of an identity of the user, an identity of objects in the physical environment, an identity of the physical environment, and a location of the XR headset within the physical environment. The server captures motion attributes associated with the XR headset and renders a virtual object in the virtual environment based at least in part on the motion attributes. The server determines a user response to the virtual object based upon user feedback signals recorded by the XR headset and adapts the user-specific virtual experience based upon the user response to the virtual object.

20 Claims, 9 Drawing Sheets

100

(56) References Cited

U.S. PATENT DOCUMENTS

| | | | |
|---|---|---|---|
| 11,759,711 B2 | 9/2023 | McCain et al. | |
| 11,776,206 B1 | 10/2023 | Gupta et al. | |
| 11,853,533 B1 | 12/2023 | Chor et al. | |
| 12,147,591 B2 | 11/2024 | Dascola et al. | |
| 12,177,258 B2 | 12/2024 | Buck | |
| 12,210,679 B1 | 1/2025 | Watkins | |
| 12,277,301 B2 | 4/2025 | Gu et al. | |
| 12,347,040 B2 | 7/2025 | Silverman et al. | |
| 2011/0050699 A1* | 3/2011 | Dawson | G06T 15/00 345/428 |
| 2016/0124499 A1 | 5/2016 | Shiu | |
| 2017/0192620 A1 | 7/2017 | Kim | |
| 2018/0174344 A1 | 6/2018 | Joo | |
| 2019/0217198 A1* | 7/2019 | Clark | H04S 7/303 |
| 2019/0353904 A1 | 11/2019 | Ardovino | |
| 2022/0075452 A1 | 3/2022 | Bokides | |
| 2022/0404621 A1 | 12/2022 | Phillips et al. | |
| 2023/0169733 A1 | 6/2023 | Krishna et al. | |
| 2023/0177855 A1 | 6/2023 | Singh et al. | |
| 2023/0205313 A1 | 6/2023 | Potetsianakis et al. | |
| 2023/0215083 A1* | 7/2023 | Hoffman-John | G06T 15/50 345/419 |
| 2023/0260219 A1* | 8/2023 | Doken | H04N 21/23418 345/633 |
| 2023/0298244 A1* | 9/2023 | Chan | G06T 13/40 345/473 |
| 2023/0377301 A1 | 11/2023 | Olia et al. | |
| 2024/0272782 A1 | 8/2024 | Pastrana Vicente et al. | |
| 2024/0354555 A1 | 10/2024 | Knipfing et al. | |
| 2025/0029337 A1 | 1/2025 | Lindskog et al. | |
| 2025/0078972 A1 | 3/2025 | Gormley | |
| 2025/0104342 A1 | 3/2025 | Viswanathan et al. | |
| 2025/0111619 A1 | 4/2025 | Singh | |
| 2025/0166294 A1 | 5/2025 | Bertolli et al. | |

* cited by examiner

100

200

DYNAMIC GENERATION AND RENDERING OF CUSTOM VIRTUAL ASSETS IN A STATE-BASED EXTENDED REALITY JOURNEY THROUGH A PHYSICAL SPACE

TECHNICAL FIELD

This application relates generally to methods and apparatuses, including computer program products, for dynamically generating and rendering custom virtual assets in a state-based extended reality (XR) journey through a physical space.

BACKGROUND

The advancement of three-dimensional (3D) computing interfaces, such as extended reality hardware and software applications, has enabled the experience in which a user's real-world viewing perspective is replaced by or enhanced with a virtual 3D environment. Generally, the term "extended reality" encompasses all different types of virtual experiences, including but not limited to: virtual reality (VR), augmented reality (AR), mixed reality (MR), and others. Typically, a user wears a headset (e.g., goggles, glasses) or similar apparatus that includes specialized display devices to render the virtual environment to the user, and the headset can include certain components (e.g., gyroscope(s), accelerometer(s), magnetometer(s), etc.) that detect and capture the user's head movements in order to update the virtual environment in response to the movements in a seamless, real-time manner.

However, current XR experiences suffer from a lack of dynamic, real-time customization, as well as limits on the mechanisms with which the virtual environment integrates with the physical environment of the user. In addition, these experiences do not account for user interaction with or attention on virtual objects, and user movement within the physical environment, to dynamically predict, generate and pre-load virtual artifacts that are subsequently rendered and displayed to the user in the virtual environment.

SUMMARY

The methods and systems described herein beneficially overcome the above-referenced technical limitations of existing XR experiences and applications by providing a hardware-software platform enabling a customized, information-rich virtual experience where virtual assets are dynamically generated in response to a wide array of context data and then visually integrated into a physical space such that users can view and interact with the virtual assets while the user is traversing through the physical space.

Embodiments of the methods and systems described herein can include a number of different technical features:

The methods and systems are configured to generate virtual representations of real objects (e.g., digital twins or replicas) that are arranged along the user's path in the XR environment. These virtual artifacts can be chosen and/or generated dynamically according to specific characteristics of the user or knowledge that the system learns about the user. The virtual content can be dynamically generated in real time using generative AI models—e.g., by feeding custom prompts to gen AI models which create virtual objects, text, audio, and the like;

The methods and systems are configured to map the physical space (and objects within the space) to enable display and positioning of virtual artifacts in relation to physical objects. An example might be placing a virtual object on a physical table, where the user can "pick up" or otherwise manipulate the virtual object—which can move in relation to the physical constraints of the table;

The methods and systems are configured to track the speed, direction, and location of the user within the physical space to estimate/predict time of arrival at certain locations. The methods and systems can use the estimated times to pre-generate and pre-load customized virtual artifacts based upon complexity so the artifacts seamlessly appear when the user arrives at the defined location.

The methods and systems are configured to enable deeper interactions between the user and the artifacts, such as using LLMs and generative AI to create content that is displayed or presented to the user. For example, the platform can generate user-specific and context-specific prompts that are fed into the models to create information and visuals for playback to the user.

The methods and systems are configured to track user engagement/interaction with virtual artifacts in XR environment to update experience in real time. The methods and systems can determine a length of time that user is looking at a particular artifact and use that information to provide new artifacts or change existing artifacts based upon engagement metrics-including ways to accomplish this without eye tracking features that may be locked by headset manufacturers.

The methods and systems are configured to make content relevant to the specific user based upon user profile data alone or in combination with other contextual data sources (e.g., current events, time of day). For example, an employee may be walking down the hallway to a meeting and the platform can generate virtual artifacts or information that prepares the employee for the meeting.

The methods and systems are configured to provide for the dynamic generation of digital twins that are specifically "assigned" to the user for the XR environment. The methods and systems include mechanisms to generate a collection/library of virtual assets (e.g., templates) that the platform can select from and dynamically adapt to different users, environments, or applications in real time. The methods and systems generate unique assets that belong to a single user and can be re-used in subsequent XR experiences with the same user. In some embodiments, the assets automatically "evolve" based upon additional knowledge the system learns about the user over time.

The invention, in one aspect, features a system for dynamically generating and rendering custom virtual assets in a state-based extended reality (XR) journey through a physical space, the system comprising a server computing device with a memory for storing computer-executable instructions and a processor that executes the computer-executable instructions. The server computing device identifies an XR headset device worn by a user. The server computing device identifies a physical environment in which the XR headset device is located, including identifying one or more physical objects arranged in defined locations in the physical environment. The server computing device generates a user-specific virtual experience for display in the XR headset device based upon one or more of: an identity of the user, an identity of the one or more physical objects, an identity of the physical environment, and a location of the XR headset device within the physical environment, where the user-specific virtual experience includes a virtual environment that is merged with the user's field of view of the physical environment. The server computing device captures motion attributes associated with the XR headset device. The server computing device renders a virtual object in the virtual environment based at least in part on the motion attributes, the virtual object associated with at least one of the physical objects. The server computing device determines a user response to the virtual object based upon user feedback signals recorded by the XR headset device. The server computing device adapts the user-specific virtual experience based upon the user response to the virtual object.

The invention, in another aspect, features a computerized method of dynamically generating and rendering custom virtual assets in a state-based extended reality (XR) journey through a physical space. A server computing device identifies an XR headset device worn by a user. The server computing device identifies a physical environment in which the XR headset device is located, including identifying one or more physical objects arranged in defined locations in the physical environment. The server computing device generates a user-specific virtual experience for display in the XR headset device based upon one or more of: an identity of the user, an identity of the one or more physical objects, an identity of the physical environment, and a location of the XR headset device within the physical environment, where the user-specific virtual experience includes a virtual environment that is merged with the user's field of view of the physical environment. The server computing device captures motion attributes associated with the XR headset device. The server computing device renders a virtual object in the virtual environment based at least in part on the motion attributes, the virtual object associated with at least one of the physical objects. The server computing device determines a user response to the virtual object based upon user feedback signals recorded by the XR headset device. The server computing device adapts the user-specific virtual experience based upon the user response to the virtual object.

Any of the above aspects can include one or more of the following features. In some embodiments, the motion attributes associated with the XR headset device comprise a headset orientation, a gaze direction, a movement direction, and a movement speed. In some embodiments, rendering the virtual object in the virtual environment comprises identifying a destination of the XR headset device within the physical environment based upon the motion attributes, the destination in proximity to a selected one of the physical objects; estimating an amount of time for the XR headset device to reach the destination based upon the motion attributes; calculating a maximum rendering time for each of one or more candidate virtual objects associated with the selected physical object; and rendering one of the candidate virtual objects in the virtual environment that has a maximum rendering time less than the estimated amount of time.

In some embodiments, rendering the virtual object in the virtual environment comprises generating a virtual object template associated with one of the physical objects in proximity to the XR headset device; customizing the virtual object template based upon at least one of the identity of the user and the identity of the physical environment; and rendering a virtual object in the virtual environment using the customized virtual object template. In some embodiments, generating a virtual object template comprises creating a prompt for generation of a virtual object template using one or more of the identity of the user, the identity of the physical object, the identity of the physical environment, and the location of the XR headset device within the physical environment; instructing a generative artificial intelligence (AI) model to generate the virtual object template using the prompt as input; and receiving the generated virtual object template as output from the generative AI model.

In some embodiments, the user feedback signals recorded by the XR headset device comprise one or more of a gaze direction of the user in relation to the virtual object and/or the physical object, a gaze duration of the user in relation to the virtual object and/or the physical object, a position of the user in relation to the virtual object and/or the physical object, a movement direction of the user in relation to the virtual object and/or the physical object, a manipulation of the virtual object and/or the physical object by the user, biometric data of the user, facial expression data of the user, and speech data of the user. In some embodiments, determining a user response to the virtual object based upon user feedback signals recorded by the XR headset device comprises generating a user interest score associated with the virtual object based at least in part upon the user feedback signals; and determining a user response to the virtual object based upon the user interest score.

In some embodiments, the server computing device renders the virtual object on top of the associated physical object in the user's field of view. In some embodiments, the user-specific virtual experience comprises a plurality of different states corresponding to an XR journey through the physical environment. In some embodiments, adapting the user-specific virtual experience based upon the user response to the virtual object comprises progressing the user-specific virtual experience from a first state to a second state and modifying one or more visual aspects of the virtual environment based upon characteristics of the second state. In some embodiments, modifying one or more visual aspects of the virtual environment based upon characteristics of the second state comprises rendering a new virtual object in the virtual environment based at least in part on the second state. In some embodiments, the user-specific virtual experience is deemed complete when the location of the XR headset device matches a defined location in the physical environment or when the user-specific virtual experience progresses to a final state.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
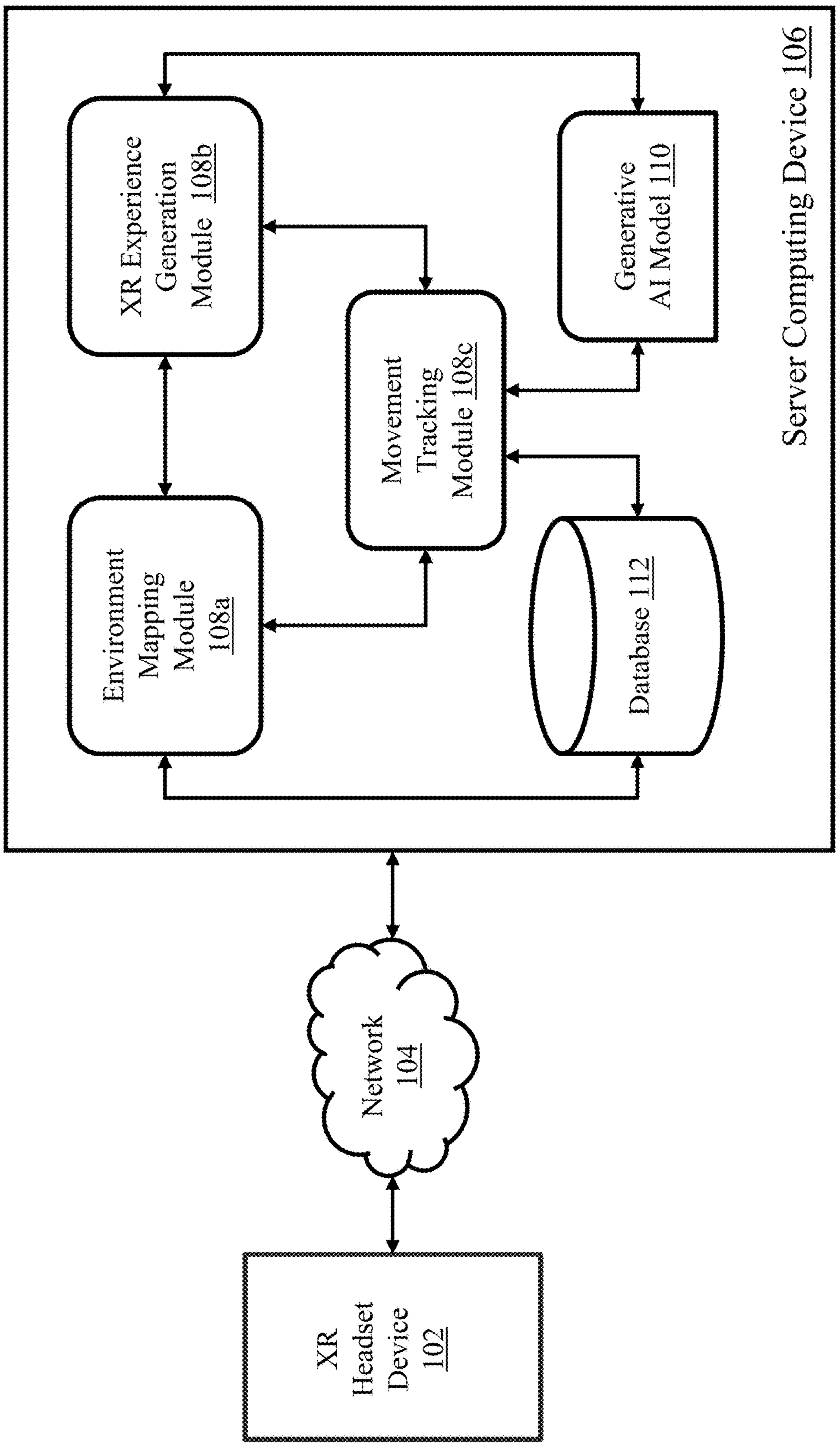
FIG. 1 is a block diagram of a system for dynamically generating and rendering custom virtual assets in a state-based XR journey through a physical space.

FIG. 1 is a block diagram of system 100 for dynamically generating and rendering custom virtual assets in a state-based XR journey through a physical space. System 100 includes XR headset device 102, communication network 104, and computing device 106 that includes environment mapping module 108*a*, XR object generation module 108*b*, movement tracking module 108*c*, generative artificial intelligence (AI) model 110, and database 112.

XR headset device 102 comprises an apparatus (e.g., headset, goggles, glasses, etc.) that enables a user to view a 3D virtual environment (such as a virtual reality (VR) environment, an augmented reality (AR) environment, a mixed reality (MR) environment, and/or an extended reality (XR) environment). Exemplary XR headset devices 102 can include, but are not limited to, the Meta Quest 3™ available from Meta Platforms, Inc., the Apple® Vision Pro™ available from Apple, Inc., and the HTC Vive XR Elite™ available from HTC Corp. XR headset device 102 connects to server computing device 106 via communication network 104 to receive data corresponding to a rendered virtual environment from server computing device 106 for display to a user wearing the device 102. In one embodiment, XR headset device 102 is coupled to server computing device 106 via a wireless network connection to enable the user wearing XR headset device 102 to move within and through a physical environment while remaining connected to server computing device 106 and without being constrained by cables or other types of physical connectors.

In some embodiments, XR headset device 102 includes a central processing unit (CPU), one or more graphics processing units (GPUs), a memory (e.g., solid state/flash RAM), one or more microphones (e.g., to capture audio from the user and/or the surrounding environment), one or more speakers (e.g., to play audio to the user), one or more cameras (e.g., cameras facing outward from the headset device that capture the physical environment around the user), a network interface (e.g., Bluetooth™, Wi-Fi™) for wirelessly connecting the headset device 102 to network 104, one or more sensors (e.g., accelerometers, gyroscopes, controller sensors, iris trackers), battery, application software, and an interior-facing display apparatus (e.g., one or more micro-OLED displays that can display a virtual environment to the wearer via magnification lenses).

In some embodiments, XR headset device 102 is coupled to one or more control devices which can enable a user wearing XR headset device 102 to interact with the virtual environment being rendered and displayed to the user. For example, a control device can be an apparatus such as a joystick, keypad, haptic controller, glove, and the like that the user holds and manipulates to provide input to server computing device 106 for interaction with the 3D virtual environment—including manipulation of virtual objects within the 3D environment. In this context, the user can provide input in many ways, including but not limited to performing gestures with the control device, pressing one or more buttons on the control device, moving the control device in relation to objects in the virtual environment, or any combination of the above. In some embodiments, the user can interface with a plurality of control devices (e.g., a joystick in each hand) to provide input to server computing device 106.

Communication network 104 enables XR headset device 102 to connect to server computing device 106 for the purpose of dynamically generating and rendering custom virtual assets in a state-based XR journey through a physical space as described herein. Network 104 is typically comprised of one or more wide area networks, such as the Internet and/or a cellular network, and/or local area networks. In some embodiments, network 104 is comprised of several discrete networks and/or sub-networks (e.g., cellular to Internet). XR headset device 102 can also be configured to connect to other remote computing devices (e.g., web servers, content repositories, externally hosted generative AI models, etc.) in addition to server computing device 106. For example, headset device 102 can connect via network 104 to server computing device 106 and/or other computing devices to, e.g., download application software for installation on the headset device 102, upload data associated with configuration or operation of the headset device 102, and retrieve content for display on headset device 102, among other functions Server computing device 106 is a device including specialized hardware and/or software modules that execute on one or more processors and interact with one or more memory modules of server computing device 106, to receive data from other components of the system 100, transmit data to other components of system 100, and perform functions for dynamically generating and rendering custom virtual assets in a state-based XR journey through a physical space as described herein. As mentioned above, server computing device 106 includes environment mapping module 108*a*, XR object generation module 108*b*, movement tracking module 108*c*, and generative artificial intelligence (AI) model 110 that execute on one or more processors of computing device 104. In some embodiments, modules 108*a*, 108*b*, 108*c*, and 110 are specialized sets of computer software instructions programmed onto one or more dedicated processors in server computing device 106 and can include specifically designated memory locations and/or registers for executing the specialized computer software instructions.

Although modules 108*a*, 108*b*, 108*c*, and 110 are shown in FIG. 1 as executing within a single server computing device 106, in some embodiments the functionality of modules 108*a*, 108*b*, 108*c*, and 110 can be distributed among a plurality of computing devices. As shown in FIG. 1, server computing device 106 enables modules 108*a*, 108*b*, 108*c*, and 110 to communicate with each other in order to exchange data and instructions for the purpose of performing the described functions. It should be appreciated that any number of computing devices, arranged in a variety of architectures, resources, and configurations (e.g., networked computing, cluster computing, virtual computing, cloud computing) can be used without departing from the scope of the technology described herein. In some embodiments, server computing device 106 is in a separate physical location from the user wearing XR headset device 102—in these embodiments, XR headset device 102 establishes a wireless connection to network 104 (e.g., via Wi-Fi or Bluetooth), and network 104 connects to server computing device 106 via a wide area network, such as the Internet. In still other embodiments, some or all of the functionality of server computing device 106 as described herein can be included in 3DXR headset device 102, such that XR headset device 102 can be configured to render the 3D virtual environment, detect input from the user wearing the device 102, and perform other functions described herein. In some embodiments, XR headset device 102 and/or server computing device 106 can include graphical processing unit (GPU) hardware that is configured to render the 3D virtual environment. Exemplary functionality of modules 108*a*, 108*b*, 108*c*, and 110 is described in detail below.

Database 112 is a computing module embedded in and/or coupled to server computing device 106 and which is configured to receive, generate, store, and provide for retrieval specific segments of data relating to the process of dynamically generating and rendering custom virtual assets in a state-based XR journey through a physical space as described herein. In some embodiments (as shown in FIG. 1), all or a portion of database 112 can be integrated with server computing device 106. In some embodiments, database 112 can be located on a separate computing device or devices, available either local connection or remote connection (e.g., cloud-based services). In some embodiments, all or a portion of database 112 can be integrated into XR headset device 102. Database 112 can comprise one or more data repositories configured to store portions of data used by other components of system 100, as will be described in greater detail below. In some embodiments, database 112 stores computing files in memory and/or on disk. For example, database 112 can be remote accessed via a LAN/WAN, or database 112 can be internal to server computing device 106.

Figure 2:
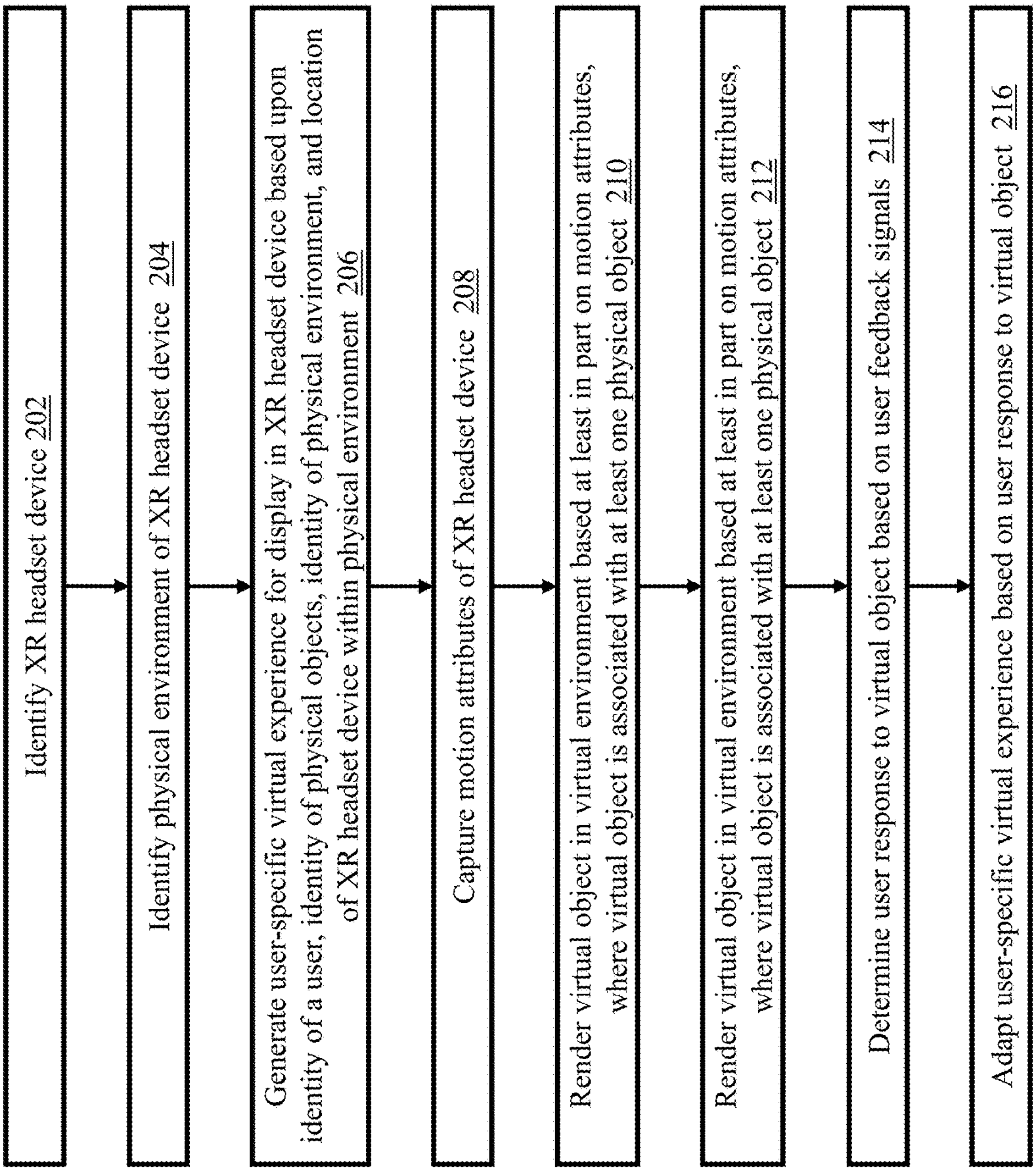
FIG. 2 is a flow diagram of a computerized method of dynamically generating and rendering custom virtual assets in a state-based XR journey through a physical space.

FIG. 2 is a flow diagram of a computerized method 200 of dynamically generating and rendering custom virtual assets in a state-based XR journey through a physical space, using system 100 of FIG. 1. As can be appreciated, XR headset device 102 can provide functionality to enable a wearer of the device 102 to launch and interact with software applications, either installed locally on device 102 or made available by server computing device 106. During operation, XR headset device 102 executes a software application to generate a virtual environment and display the virtual environment to the wearer of the headset device 102 via an interior display (i.e., micro-OLED screens embedded inside the housing of the headset device). In some embodiments, the virtual environment comprises an augmented reality (AR), extended reality (XR), or mixed reality (MR) environment—where the user sees elements of both the surrounding physical environment and the generated 3D virtual environment. As can be appreciated, the virtual environment can include one or more objects, e.g. three-dimensional virtual objects positioned within the environment and with which the user can interact. The software application executing on XR headset device 102 can further display user interface elements to the user (e.g., menus, icons, buttons, etc.) as part of the virtual environment so that the user can perform a variety of functions, such as configuring the headset device, providing input to the executing software application, and so forth.

As the user of the XR headset device 102 interacts with the virtual environment and/or moves within the physical environment, the headset device 102 can capture one or more data elements, including but not limited to: (i) data associated with execution of software application that is rendering the virtual environment to the user; (ii) data associated with the virtual environment being displayed to the user; (iii) data associated with the user operating the XR headset device 102; (iv) data associated with the location, position, orientation, and/or movement of the XR headset device 102 within the physical space; (v) data associated with the physical space (e.g., dimensions, layout, walls, doors); and (vi) data associated with the location, position, movement, and/or identity of one or more physical objects in the physical environment.

In the embodiments described herein, a user may enter a physical environment and put on XR headset device 102. In one example, the physical environment may be an office building that the user is visiting for a business meeting. Other examples can include, but are not limited to, museums, historical sites, schools, parks, retail stores, sports arenas, and concert halls. In some embodiments, upon entering the physical environment, the user may be provided with the XR headset device 102 by personnel associated with the physical environment.

Figure 3:
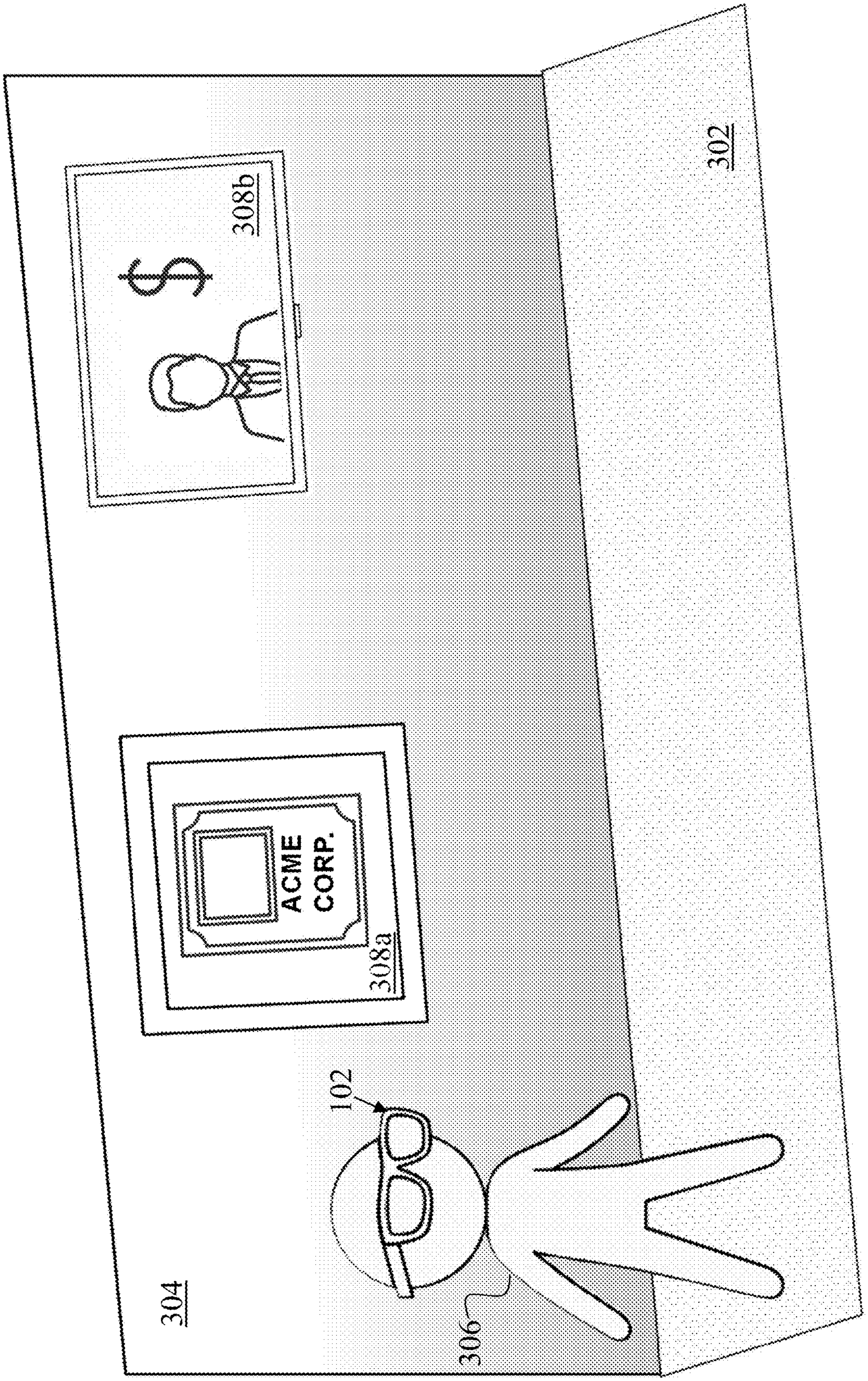
FIG. 3 is a diagram of an exemplary physical environment to illustrate operation of the methods and systems described herein.

FIG. 3 is a diagram of an exemplary physical environment to illustrate operation of the methods and systems described herein. As shown in FIG. 3, the physical environment is depicted as a cutaway view of a hallway, with floor 302 and wall 304. The user 306 wearing XR headset device 102 is positioned at one end of the hallway.

The user may be asked to log in to the XR headset device 102 by, e.g., providing authentication credentials (e.g., username/password, PIN, etc.) via a user interface displayed in XR headset device 102. In some embodiments, after receiving the authentication credentials, XR headset device 102 can connect to server computing device 106 and/or one or more other remote computing devices to authenticate the user and retrieve information associated with the user (e.g., user profile, account information, employment information, etc.). In some embodiments, headset device 102 can store the authentication credentials and/or user information in local memory.

XR headset device 102 establishes a connection to server computing device 106 and provides the authentication credentials and/or user information to server computing device. XR headset device 102 also provides identifying information associated with the headset device to the server when establishing the connection. For example, XR headset device 102 can transmit a device ID, serial number, or other indicia that uniquely identifies the headset device. Upon receiving the identifying information, server computing device 106 identifies (step 202) the XR headset device 102 using the identifying information. In some embodiments, server computing device 106 searches database 112 using the identifying information to retrieve additional information associated with the XR headset device 102—including, but not limited to, device manufacturer/model/version (e.g., Apple Vision Pro), device hardware attributes (e.g., CPU, memory, GPU), installed application software, and so forth.

In some embodiments, server computing device 106 also generates a record in database 112 that maps the identifying information of XR headset device 102 to user-identifying information associated with the user that is currently wearing the headset device. For example, server computing device 106 can generate a record that indicates a specific headset device is currently being worn by a specific user, and the record can also include other metadata such as start time (e.g., when the user started wearing the device).

Next, environment mapping module 108_a_ identifies (step 204) a physical environment in which the XR headset device 102 is located, including identifying one or more physical objects arranged in defined locations in the physical environment. In some embodiments, XR headset device 102 can be preconfigured with a physical environment identifier that is provided to server computing device 106 when the device is activated and/or when the user first authenticates. In some embodiments, environment mapping module 108_a_ can retrieve a current location of XR headset device 102 (e.g., by requesting coordinates from the headset) and determine a physical environment identifier that is associated with the current location of the headset device. Environment mapping module 108_a_ can search database 112 using the physical environment identifier to retrieve information associated with the physical environment in which the XR headset device 102 is operating. For example, module 108_a_ can retrieve data corresponding to the three-dimensional physical layout of the environment-such as position and/or configuration of walls, location of doors and windows, position and orientation of lighting, length/width of passageways, and height of ceilings. The physical environment information can also include data corresponding to one or more physical objects that are located in the environment, with the data including positional coordinates of the objects within the environment, orientation of the objects in relation to the environment, attributes of the objects (e.g., type of object, visual characteristics of object, etc.), and other similar information. It should be appreciated that the physical objects contemplated herein can be any type of object able to be positioned in a physical space.

Using the example hallway of FIG. 3, environment mapping module 108_a_ can identify the physical environment in which the headset device 102 worn by the user is located, and module 108_a_ determines that the physical environment comprises a hallway with defined length and width measurements and a defined ceiling height measurement. Module 108_a_ can also determine that the physical environment includes two physical objects 308_a_ and 308_b_. In this example, physical object 308_a_ comprises a two-dimensional framed stock certificate display hanging on wall 304 and physical object 308_b_ comprises a video monitor that is showing financial news programming, also hanging on wall 304. Module 108_a_ can retrieve the associated data for each of the physical objects 308_a_, 308_b_ as described above.

Environment mapping module 108_a_ provides the physical environment information, the XR headset information, and the user-related information to XR experience generation module 108_b_. XR experience generation module 108_b_ generates (step 206) a user-specific virtual experience for display in XR headset device 102 based upon the captured information, which includes one or more of: an identity of the user 306, an identity of the one or more physical objects 308_a_, 308_b_, an identity of the physical environment, and a location of the XR headset device 102 within the physical environment.

Generally, a user-specific virtual experience comprises an arrangement of virtual assets (at least some of which are personalized based upon user attributes or information) that are dynamically generated by server computing device 106 and/or XR headset device 102 for presentation to the user via headset device as the user moves within the physical environment. In this context, a virtual asset can comprise a graphical element (e.g., two-dimensional or three-dimensional object, image, video, text, animation, hologram, webpage, etc.) that is included in the XR environment being displayed to the user of headset device 102, an audio segment played to the user of headset device 102 via the embedded speakers, or a combination thereof. In some embodiments, the user-specific virtual experience includes a virtual environment that is merged with the user's field of view of the physical environment—such that the user can see both the virtual environment and the physical environment concurrently. In these embodiments, some or all of the virtual environment (including any virtual assets displayed therein) can be semi-transparent to enable the user to see an unobstructed view of the physical environment while also viewing the virtual environment. In some embodiments, portions of the virtual environment are opaque in order to replace or cover certain aspects of the physical environment within the user's field of view with corresponding aspects of the virtual environment. For example, the virtual environment can include an opaque virtual object that is layered on top of a corresponding physical object—such that the user only sees the virtual object and cannot see the underlying physical object.

The user-specific virtual experience is correlated to the physical environment and the physical objects contained in the environment. In some embodiments, XR experience generation module 108_b_ initializes the user-specific virtual experience when the user first authenticates to the headset device 102. At initialization time, XR experience generation module 108_b_ can retrieve data from one or more of XR headset device 102, environment mapping module 108_a_, movement tracking module 108_b_, generative AI model 110, and database 112 in order to generate the user-specific virtual experience.

In some embodiments, the user-specific virtual experience is constructed according to a state-based framework. In these embodiments, the virtual experience is segmented into a plurality of states each associated with one or more virtual assets, physical objects, environment locations, and/or feedback criteria. Also, in some embodiments, the user-specific virtual experience can be initially arranged according to a predicted or expected movement path of the user. For example, a first state of the virtual experience can correspond to the location of the user when they first authenticate to, and/or put on, the headset device 102 (e.g., the left-hand side of the hallway in FIG. 3). XR environment generation module 108_b_ can retrieve a pre-configured or pre-scripted virtual experience from, e.g., database 112, including the plurality of states comprising the virtual experience. In some embodiments, the pre-configured virtual experience can comprise a template data structure that can be reused for multiple different headsets and/or users. In the example of FIG. 3, the virtual experience can comprise the initial state (i.e., when the user first authenticates to the headset device 102 at the start of the hallway, at the left-hand side of FIG. 3), one or more intermediate states (e.g., when the user is in proximity to each of the physical objects 308_a_ and 308_b_ while moving down the hallway), and an end state (i.e., when the user reaches the end of the hallway, at the right-hand side of FIG. 3). It should be appreciated that, in some embodiments, when XR experience generation module 108_b_ first loads the pre-configured virtual experience, the virtual experience has not yet been customized for the user currently wearing XR headset device 102.

After loading the virtual experience and while the experience is still within the initial state, XR experience generation module 108_b_ dynamically generates one or more virtual assets that correspond to one or more states of the virtual experience, including the first state and any subsequent state(s). In some embodiments, module 108_b_ can initially customize the virtual assets for the user wearing the headset device 102 based upon, e.g., the user information collected when the user authenticates to the headset device. For example, the loaded virtual experience may include an intermediate state that relates to a 2D advertisement poster for a specific product that is physically located within the user's field of view. At initial customization time, XR experience generation module 108*b* can generate a virtual asset comprising an advertisement for a different product that is predicted to be of interest to the user (e.g., based upon the user's demographics, purchase history, or other user attributes). Then, when the user reaches the intermediate state, XR experience generation module 108*b* can transmit the generated virtual asset to XR headset device 102 for display to the user as an overlay on the physical poster.

In some embodiments, XR experience generation module 108*b* provides input to and receives output from generative AI model 110 as part of the dynamic generation of virtual assets. Generative AI model 110 is configured to receive a prompt (e.g., text instructions and/or digital files) from module 108*b* and generate digital content (e.g., images, video, audio, text) based on the prompt. Exemplary generative AI models 110 for use with server computing device 106 can include, but are not limited to, frameworks such as Generative Adversarial Networks (GANs), Variational Autoencoders (VAEs), and autoregressive models like PixelRNN. In some embodiments, generative AI model 110 can be hosted on an external computing device or platform and server computing device 106 can communicate with generative AI model 110 using, e.g., an application programming interface (API). In some embodiments, XR experience generation module 108*b* uses the prompt to define specific features or attributes of the content to be generated by generative AI model 110, as well as to provide examples or instructions that guide the generative AI model in construction of the digital content. Module 108*b* can then incorporate the output from generative AI model 110 into the generation of virtual assets as described herein.

In some embodiments, XR experience generation module 108*b* can generate (or retrieve from database 112) a virtual object template associated with one of the physical objects 308*a*, 308*b* in the physical environment (e.g., in proximity to the XR headset device 102). Generally, a virtual object template can comprise a data structure that defines one or more visual characteristics of the virtual object and the template also includes one or more parameters that can be dynamically inserted at generation time to customize the virtual object. For example, a virtual object template can define the layout and visual design of a user interface window with a pre-defined text message to be displayed in a virtual environment. The virtual object template can include parameters corresponding to the user's first and last name; the value of each of the parameters is empty in the template. Module 108*b* can retrieve the virtual object template and insert the user's first and last name into the template when the virtual asset is generated and rendered, which results in a customized user interface window that displays the user's name as part of the text displayed in the window.

It should be appreciated that, to conserve computing resources and enable a fully dynamic and adaptable virtual experience, module 108*b* does not have to fully generate the specific virtual assets that will be displayed to the user at each stage of the experience during initial loading. As one example, during initial loading, instead of actually rendering and storing a complete 3D virtual asset that will be displayed to the user at an intermediate state, module 108*b* can generate and store data that comprises certain attributes or characteristics of the virtual asset (e.g., color, size, shape, text, audio) that will be generated and presented to the user at a particular state of the experience. Then, when the user transitions between different states-such as moving from one location to another within the physical environment-XR experience generation module 108*b* can retrieve the stored attributes and dynamically create (i.e., render) each virtual asset based upon the stored attributes. As will be described in greater detail below, another advantage of the dynamic generation of virtual assets is the ability of module 108*b* to adapt features or characteristics of virtual assets 'on-the-fly' while the user is participating in virtual experience to provide for a fully unique and user-specific experience.

XR experience generation module 108*b* can initialize a data structure for storage in database 112 that comprises the state-based framework for the user-specific virtual experience including the information (e.g., graphical elements, attributes, technical features) associated with each of the virtual assets being generated and/or customized for the user. As the user progresses through the plurality of states (e.g., by moving through the physical environment, by viewing and/or interacting with virtual assets displayed in the virtual environment), module 108*b* can update the data structure to reflect the user's progress. As mentioned previously, for each state in the state-based framework, module 108*b* can capture data associated with one or more of: (i) data associated with execution of software application that is rendering the virtual environment to the user; (ii) data associated with the virtual environment being displayed to the user; (iii) data associated with the user operating the XR headset device 102; (iv) data associated with the location, position, orientation, and/or movement of the XR headset device 102 within the physical space; (v) data associated with the physical space (e.g., dimensions, layout, walls, doors); and (vi) data associated with the location, position, movement, and/or identity of one or more physical objects in the physical environment. Module 108*b* can store the data in database 112 in association with the particular state of the user-specific virtual experience. When a user satisfies or completes a given state of the experience, module 108*b* can update the data structure to reflect the user's advancement through the experience. This also provides the benefit of being able to resume an in-progress user-specific virtual experience in the event the experience is interrupted or prematurely terminated.

Using the example of FIG. 3, XR experience generation module 108*b* initializes a virtual experience for the user 306 when the user first authenticates to the headset device 102 and is standing at the start of the hallway. As described above, the initialization can include loading of a pre-configured virtual experience and customization of one or more virtual assets in the experience based upon the information collected from the XR headset device 102 (e.g., user information, headset information, physical environment information). For example, module 108*b* can determine that the user's predicted movement path through the environment includes three states in addition to the initial state: (1) when the user is located in proximity to physical object 308*a* (e.g., a framed stock certificate display), (2) when the user is located in proximity to physical object 308*b* (e.g., a video monitor showing a financial news program), and (3) when the user is standing at the end of the hallway. Each of these states is captured in the pre-configured virtual experience.

At initialization, module 108*b* can partially or completely generate one or more candidate virtual assets that correspond to each of the experience states based upon the captured information. In the example of FIG. 3, the physical object 308*a* is an original stock certificate issued by Acme Corp. in 1925. Module 108*b* can configure the user-specific virtual experience to generate one or more candidate virtual assets for the physical object 308*a*. In this example, a first candidate virtual asset can include a high-resolution, animated avatar of the founder of Acme Corp. that is synchronized with an audio file that explains the origins of Acme Corp., to be displayed to the user of headset device 102 in a virtual environment next to the user's view of the framed stock certificate 308*a*. A second candidate virtual asset can include a user interface frame with text that summarizes the origins of Acme Corp., to be displayed next to the framed stock certificate. A third candidate virtual asset can be a digital replica of an original stock certificate issued by XYZ Corp. in 1962, to be positioned on top of the physical object 308*a* in the virtual environment displayed to the user via headset device 102.

Module 108*b* can determine that the user wearing headset device 102 is an employee of XYZ Corp. Therefore, module 108*b* selects the third candidate virtual asset to be displayed to the user in the virtual environment as the user is approaching and standing near the physical object 308*a*. As a result, the user will not be able to see the physical Acme Corp. stock certificate hanging on the wall, but instead the user will only see the virtual XYZ Corp. stock certificate generated by module 108*b*.

Similarly, XR experience generation module 108*b* can determine that the financial news program currently being shown on the video monitor 308*b* relates to the day's stock market performance and trends. Module 108*b* can determine that the user has an investment portfolio that comprises shares in several different companies. Module 108*b* can configure the user-specific virtual experience to generate a first candidate virtual asset comprising a graphical display of real-time market prices of shares that the user holds in their portfolio and a second candidate virtual asset comprising a display of general (i.e., non-user specific) market information. Module 108*b* can select the first candidate virtual asset for display, and module 108*b* configures the asset to be displayed in the virtual environment of headset device 102 adjacent to the user's view of the physical video monitor 308*b*, as the user is approaching and standing near the monitor 308*b*.

Turning back to FIG. 2, as the user begins moving within the physical environment, movement tracking module 108*c* captures (step 208) motion attributes associated with the XR headset device 102 being worn by the user. In some embodiments, XR headset device 102 continuously transmits real-time position information to server computing device 106, which enables movement tracking module 108*c* to have an accurate, up-to-date understanding of the location of the user/headset device 102 within the physical environment. It should be appreciated that the real-time position information includes not only location of the headset device 102, but also attributes including but not limited to orientation and rotation of the headset device 102 (which can be used to determine, e.g., the user's gaze direction). Also, movement tracking module 108*c* can analyze the incoming motion attributes to determine and/or predict the user's path through the physical environment, including calculating attributes such as speed (i.e., how fast the user is moving) and direction (i.e., which way the user is moving).

Figure 4:
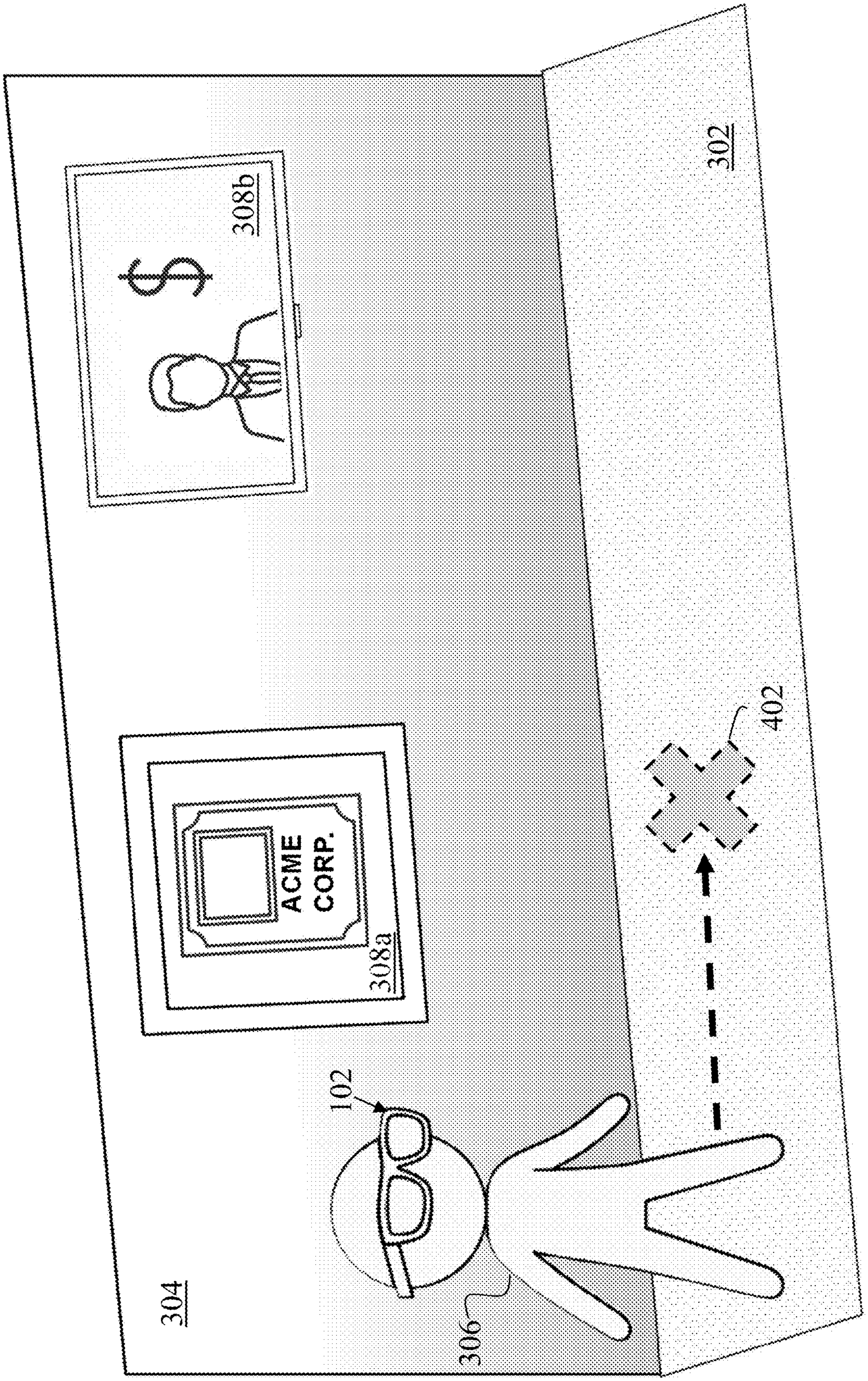
FIG. 4 is a diagram of the exemplary physical environment of FIG. 3, showing a user moving toward a location in proximity to a physical object.

Based upon the user's movement speed and direction, among other data, as calculated by movement tracking module 108*c*, XR experience generation module 108*b* can determine whether to transition the user-specific virtual experience from a current state to a next state. FIG. 4 is a diagram of the exemplary physical environment of FIG. 3, showing the user 306 moving toward location 402 in proximity to physical object 308*a*. When XR experience generation module 108*b* determines that the user is moving toward location 402, module 108*b* can begin a transition from the initial state to an intermediate state in the user-specific virtual experience.

As part of the transition, XR experience generation module 108*b* renders (step 210) render a virtual object in the virtual environment based at least in part on the motion attributes, where the rendered virtual object is associated with at least one of the physical objects in the physical environment. In some embodiments, module 108*b* can dynamically generate and render one or more virtual assets that will be presented to the user at or near their predicted time of arrival at location 402. As explained above, through data provided by environment mapping module 108*a* (e.g., physical dimensions of the environment, user location, physical object locations) and movement tracking module 108*b* (e.g., user's movement speed and direction), XR experience generation module 108*b* can determine (i) the distance between the user's current location and location 402 of physical object 308*a* and (ii) a predicted or estimated amount of time for the user to arrive at location 402. For example, module 108*b* can determine that the user is 75 feet away from location 402 and the user is predicted to arrive at or near location 402 in approximately 15 seconds (e.g., based upon the user's current speed and movement direction).

As described above, one or more candidate virtual assets associated with physical objects 308*a*, 308*b* are either predefined in the current user-specific virtual experience, or the candidate virtual assets are partially or completely generated by XR experience generation module 108*b* at the time the user-specific virtual experience is initialized. For each candidate virtual asset associated with the physical object 308*a* at location 402, module 108*b* can calculate a maximum time required to generate and render the candidate virtual asset. Using the example candidate virtual assets described above, module 108*b* can determine that generating and rendering the full-motion, voiced avatar of the Acme Corp. founder would take approximately 45 seconds, rendering the user interface frame with text that summarizes the origins of Acme Corp. would take approximately 2 seconds, and rendering the digital replica of the XYZ Corp. stock certificate would take approximately 5 seconds. As a result, XR experience generation module 108*b* can eliminate the full-motion, voiced avatar of the Acme Corp. founder from consideration as a candidate virtual asset because module 108*b* would not be able to generate and render the asset before the user is predicted to arrive at location 402. Module 108*b* can determine that either of the second candidate asset (user interface frame with text) or the third candidate asset (digital replica) can be generated and rendered before the user's arrival at location 402. Because module 108*b* also knows that the user is an employee of XYZ Corp., module 108*b* can select the third candidate asset (digital replica) for generation and presentation to the user in place of the physical object 308*a* when the user 306 arrives at or near location 402.

Similarly, XR experience generation module 108*b* can utilize generative AI model 110 when generating candidate virtual assets (as described above) and also when determining which candidate asset should be selected for display. For example, module 108*b* can generate a prompt to model 110 that requests a plurality of digital content candidates according to, e.g., user attributes, physical environment attributes, physical object attributes, headset hardware and/or software configuration, among other features. Module 108*b* can also instruct model 110 to vary the characteristics of the digital content candidates based upon, e.g., the predicted or estimated amount of time for the user 306 to arrive at location 402. For example, module 108*b* can instruct model 110 to create (1) a high-resolution image with specific visual elements that takes the model 25 seconds to generate and (2) a low-resolution image with different visual elements that takes the model 4 seconds to generate. Based upon the user's estimated time of arrival at location 402, module 108*b* can select one of the candidates for display as a visual asset that has a maximum generation time which is less than the estimated time of arrival.

Figure 5:
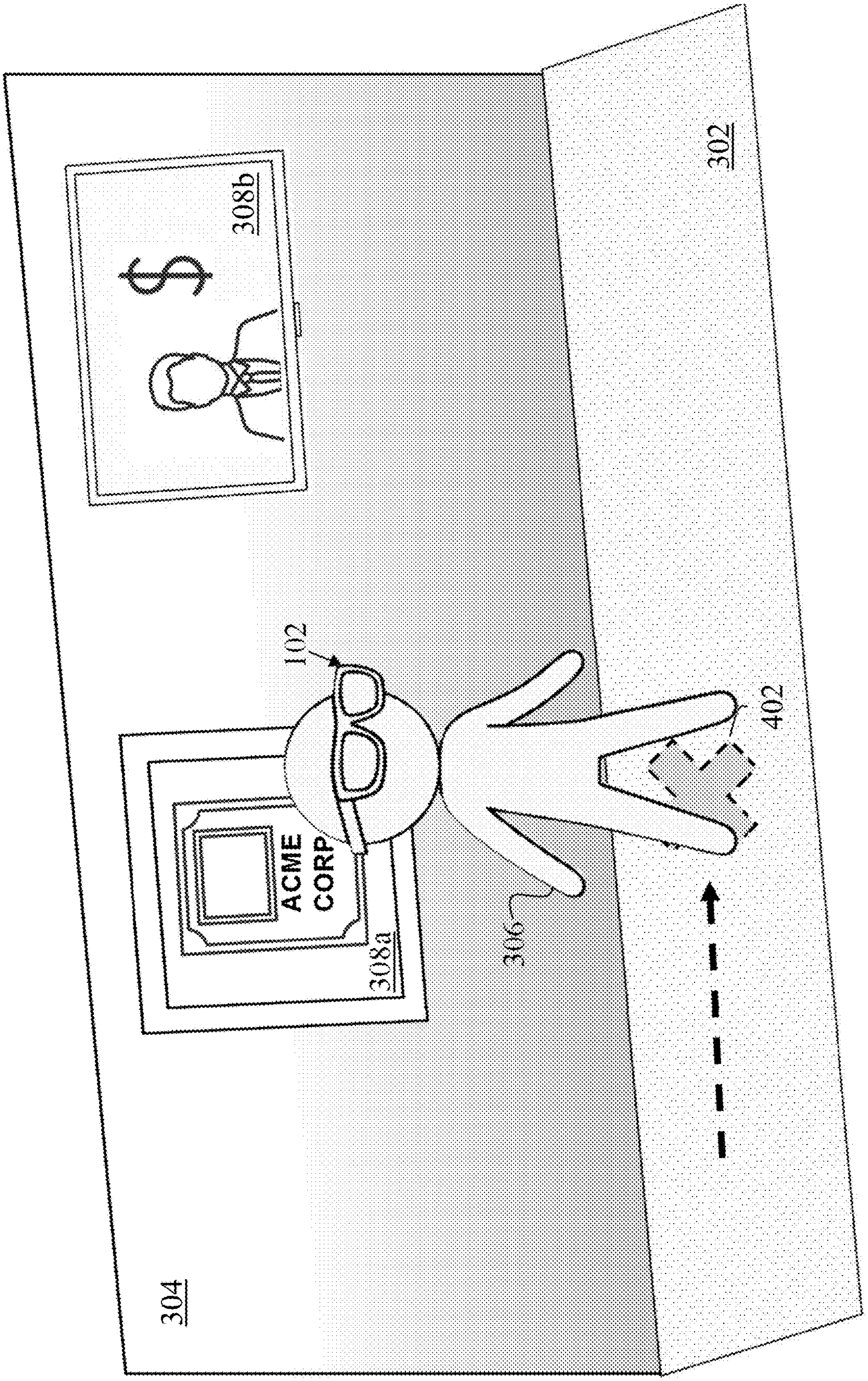
FIG. 5 is a diagram of the exemplary physical environment of FIG. 3, showing a user arriving at a location and viewing a physical object.

Once XR experience generation module 108*b* has generated and rendered the virtual asset, module 108*b* provides the virtual asset to XR headset device 102 for display to the user in a virtual environment when the user 306 arrives at, or is approaching, location 402 FIG. 5 is a diagram of the exemplary physical environment of FIG. 3, showing the user 306 arriving at location 402 and viewing physical object 308*a*. As shown in FIG. 5, the user is standing in front of physical object 308*a* comprising the framed Acme Corp. stock certificate.

Figure 6:
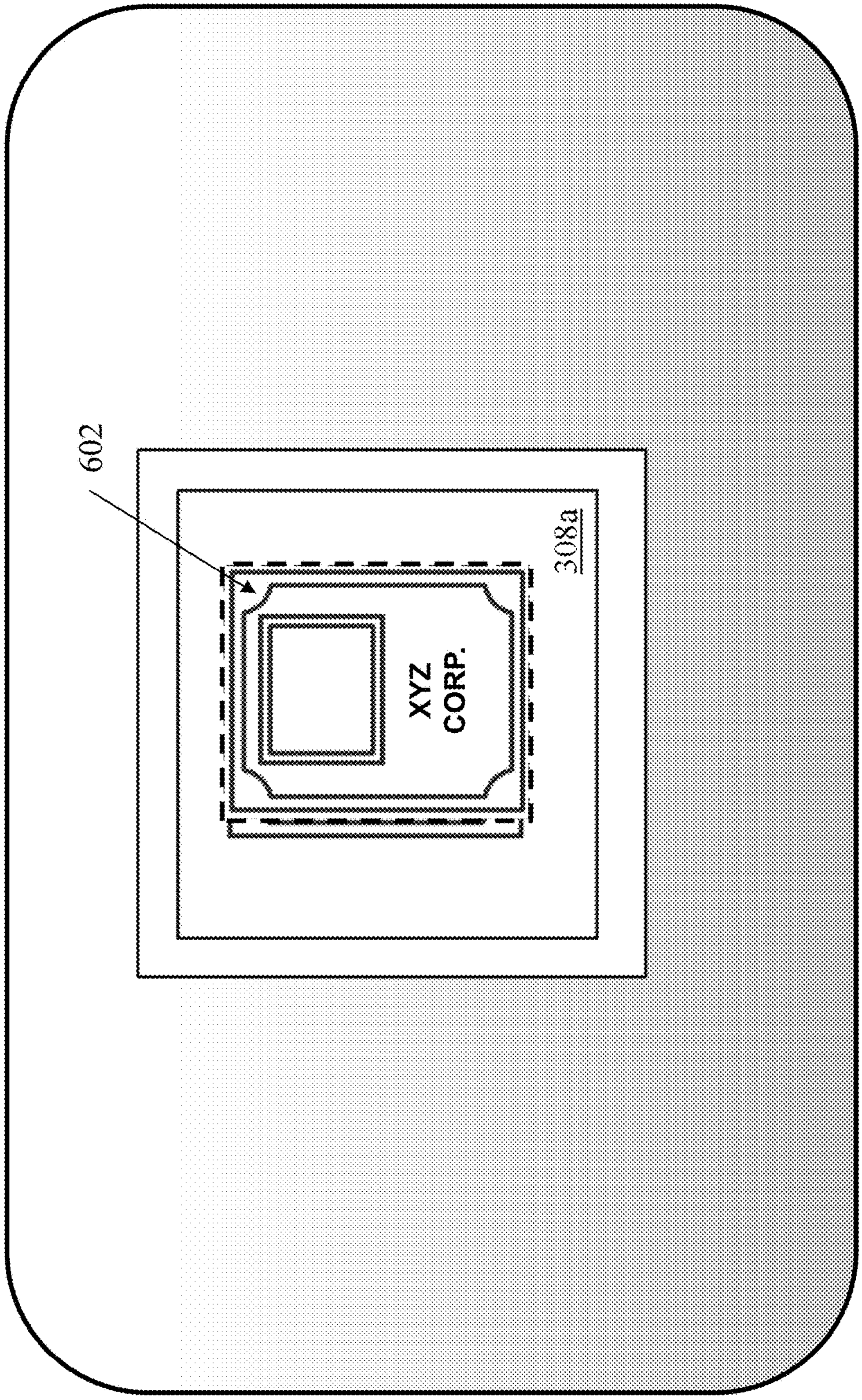
FIG. 6 is a diagram illustrating a user's view of a combined virtual and physical environment as displayed in an XR headset device, including a digital replica.

However, as can be appreciated, the user wearing headset device 102 does not see the physical Acme Corp. stock certificate. As a result of the steps described above, XR headset device 102 displays a digital replica of an XYZ Corp. stock certificate in the virtual environment, such that the digital replica is overlaid on top of (and obscuring) the physical Acme Corp. certificate in the user's field of view. FIG. 6 is a diagram illustrating the user's view of the combined virtual and physical environment as displayed in XR headset device 102 when the user is at location 402, including the digital replica 602 generated by XR experience generation module 108*b*. As shown in FIG. 6, the user views a portion of the physical object 308*a* (e.g., the frame and backing of the physical stock certificate). XR headset device 102 displays the digital replica 602 of the XYZ Corp. stock certificate on top of the Acme Corp. certificate, thereby replacing the user's view of the Acme Corp. certificate with the digital replica.

Another important aspect of the user-specific virtual experience generated by system 100 is the ability for system 100 to capture feedback signals associated with the user wearing headset device 102 while the user is participating in the virtual experience. Based upon the user feedback signals, XR experience generation module 108*b* determines (step 212) a user response to the virtual object. Exemplary user feedback signals include, but are not limited to, a gaze direction of the user in relation to the virtual object and/or the physical object, a gaze duration of the user in relation to the virtual object and/or the physical object, a position of the user in relation to the virtual object and/or the physical object, a movement direction of the user in relation to the virtual object and/or the physical object, a manipulation of the virtual object and/or the physical object by the user, biometric data of the user, facial expression data of the user, and speech data of the user.

For example, upon reaching location 402 and having the digital replica certificate 602 generated and displayed in XR headset device 102, the user may stand in front of physical object 308*a* and direct their gaze toward the digital replica 602. In another example, the user may interact with the digital replica—e.g., by reaching out and picking it up. In another example, the user may utter a comment relating to the digital replica that is recorded by microphone(s) of headset device 102. XR headset device 102 can capture one or more user feedback signals generated from movement and/or behavior of the user in relation to the physical environment and/or the virtual environment, and device 102 transmits the captured feedback signals to XR experience generation module 108*b*.

Module 108*b* analyzes the user feedback signals to determine the user's response to the virtual object. In some embodiments, module 108*b* can generate a user interest score associated with the virtual object based at least in part upon the user feedback signals and determine a user response to the virtual object based upon the user interest score. In some embodiments, the user interest score can be generated as a numerical value on a defined scale (e.g., 1-100), with higher scores being indicative of greater user interest and lower scores being indicative of lower user interest. In some embodiments, the user interest score can be a label value (e.g., Not Interested, Somewhat Interested, Very Interested). Using the example of FIG. 5, module 108*b* can calculate an amount of time that the gaze of the XR headset device 102 was directed to the digital replica 602 while the user was standing at location 402. Based upon this calculation, module 108*b* can determine the user interest score for the digital replica. For example, if the user's gaze was directed at the digital replica for only a few seconds, module 108*b* may determine that the user's interest score for the digital replica is low (e.g., <20). Conversely, if the user's gaze was directed at the digital replica for several minutes, module 108*b* may determine that the user's interest score for the digital replica is high (e.g., >80).

Based upon the user interest score, XR experience generation module 108*b* can determine a user response to the virtual asset. For example, virtual assets that generate a high user interest score can correspond to a positive user response, while virtual assets that generate a low user interest score can correspond to a negative user response. Advantageously, module 108*b* can capture the user interest score(s) and/or user response(s) to various virtual assets generated while the user is participating in the virtual experience and leverage the captured data to adapt the current user-specific virtual experience. In addition, module 108*b* can store the captured data in database 112 for reference during subsequent virtual experience sessions with either the same user or with other users to improve the dynamic generation of virtual assets and/or sequencing of user experiences.

Using the example above, XR experience generation module 108*b* may determine that the user's response to the digital replica was negative because the user simply kept walking past the physical object 308*a* and did not stop to view the digital replica 602. Based upon this feedback, module 108*b* can adapt the generation of virtual assets in subsequent states of the user-specific virtual experience. Module 108*b* can generate and/or candidate virtual assets that have different characteristics or features than the digital replica, in view of the user's negative reaction to the existing digital replica. For example, when using generative AI model 110 to create candidate virtual assets, module 108*b* can include instructions as part of the model prompt that direct the model 110 to avoid generating virtual assets that have the same or similar features as the digital replica. In some embodiments, XR experience generation module 108*b* can further adapt the structure of the user-specific virtual experience based upon user response to specific states and/or virtual assets. For example, module 108*b* can re-arrange the sequence of states in a particular virtual experience to emphasize states that are predicted to have a positive user response based upon user feedback collected during earlier states, while also deemphasizing or even eliminating states that are predicted to have a negative user response.

Figure 7:
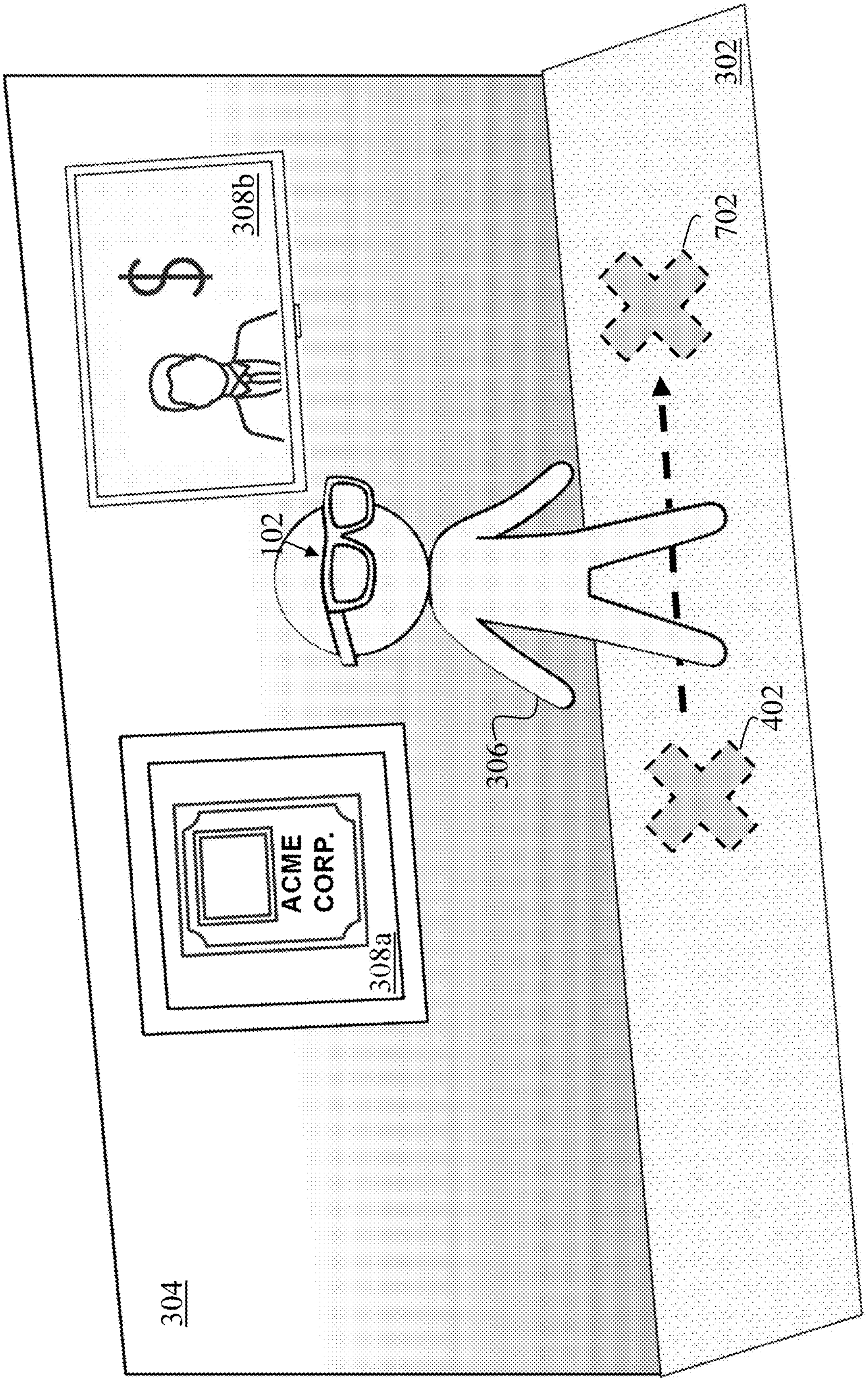
FIG. 7 is a diagram of the exemplary physical environment of FIG. 3, showing a user moving toward a second location in proximity to a second physical object.

Continuing with the example above, at a certain point the user 306 begins moving away from location 402, continuing their journey down the hallway and approaching a new location in proximity to physical object 308*b* (i.e., video monitor showing a financial news program). FIG. 7 is a diagram of the exemplary physical environment of FIG. 3, showing the user 306 moving toward location 702 in proximity to physical object 308*b*. Based on data from movement tracking module 108*c*, XR experience generation module 108*b* determines that the virtual experience should transition from one intermediate state to the next intermediate state because the user is moving toward object 308*b*.

As described previously with respect to FIGS. 4 and 5, module 108*b* can determine an estimated time of arrival of the user at location 702 and generate one or more candidate virtual assets to be rendered and displayed to the user via headset device 102 in connection with physical object 308*b* when the user 306 arrives at location 702. In one example, module 108*b* can determine that the user 306 will arrive at location 702 in approximately 13 seconds. As mentioned above, the user 306 has an investment portfolio that comprises shares in several different companies. Module 108*b* can configure the user-specific virtual experience to generate a first candidate virtual asset comprising a graphical display of real-time market prices of shares that the user holds in their portfolio and a second candidate virtual asset comprising a display of general (i.e., non-user specific) market information. In this example, module 108*b* determines that generation and rendering of the first candidate virtual asset will take approximately 10 seconds. Because the generation and rendering step is estimated to finish prior to the user arriving at location 702, module 108*b* selects the first candidate virtual asset for generation and rendering. Module 108*b* transmits the rendered virtual asset to XR headset device 102 before the user arrives at location 702. Headset device 102 can store the rendered virtual asset in local memory to be displayed in the virtual environment of headset device 102 adjacent to the user's view of the physical video monitor 308*b*, as the user is approaching and standing near the monitor 308*b* at location 702.

Figure 8:
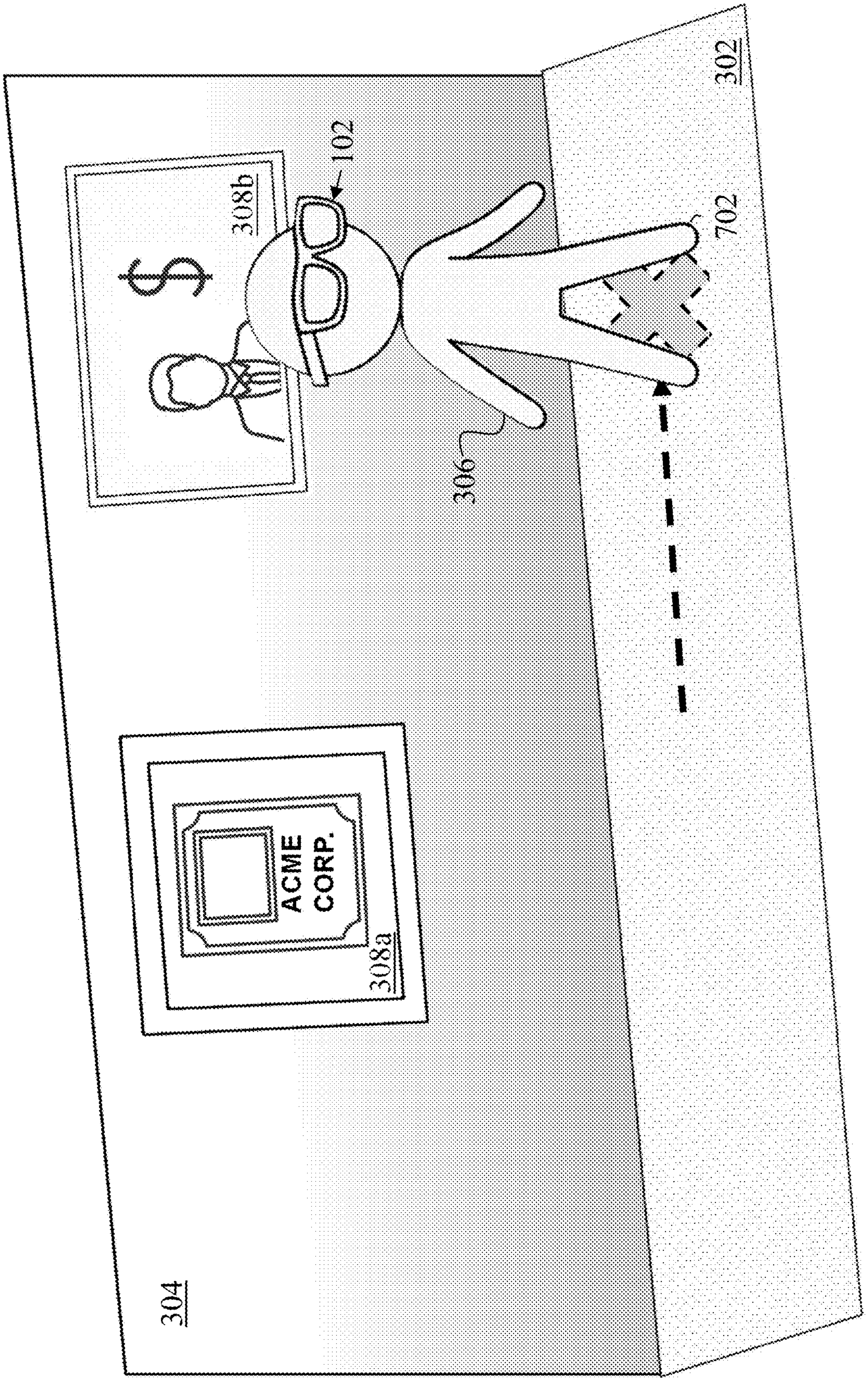
FIG. 8 is a diagram of the exemplary physical environment of FIG. 3, showing a user arriving at a second location and viewing a second physical object.
Figure 9:
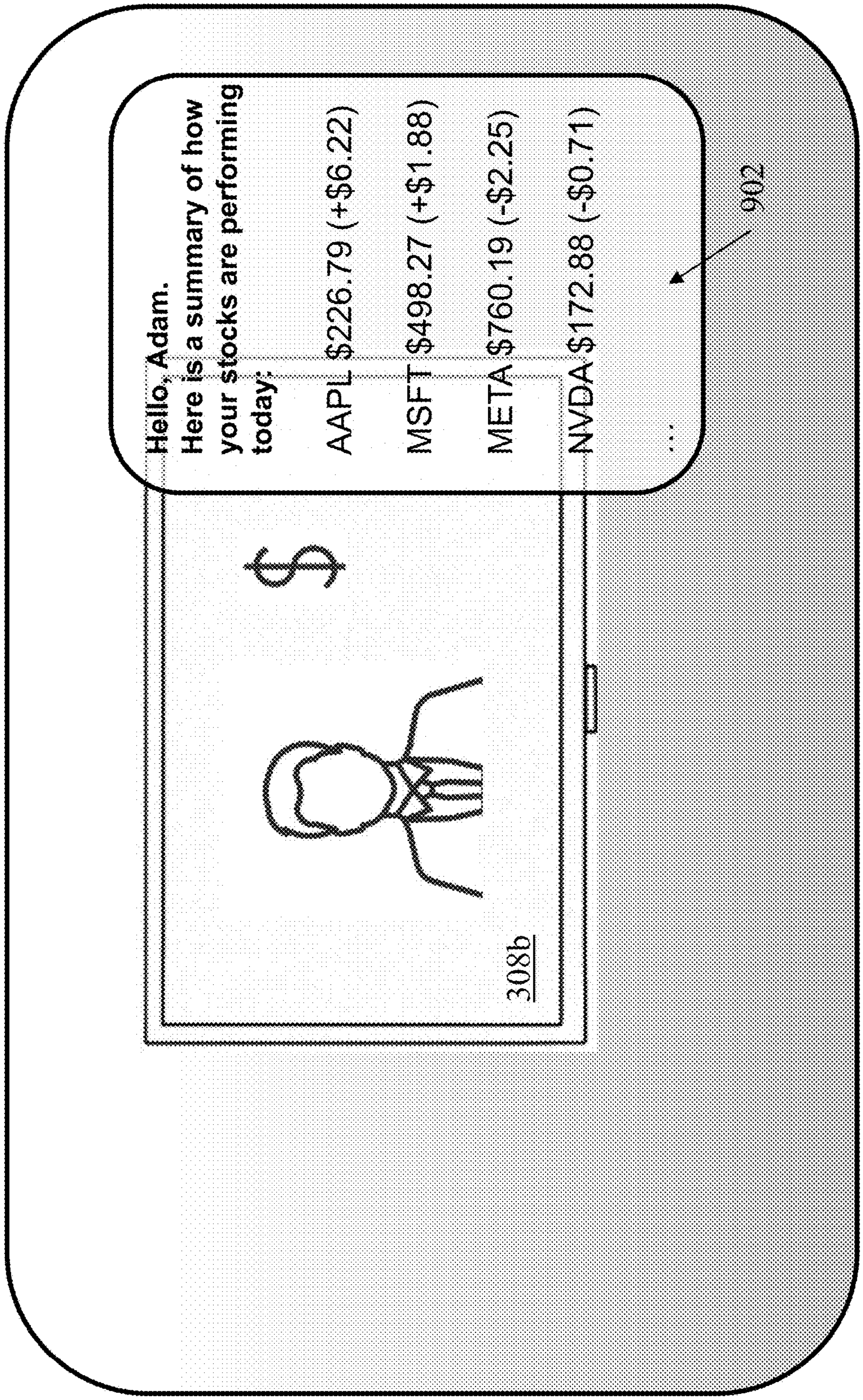
FIG. 9 is a diagram illustrating a user's view of a combined virtual and physical environment as displayed in an XR headset device, including a customized portfolio information user interface.

FIG. 8 is a diagram of the exemplary physical environment of FIG. 3, showing the user 306 arriving at location 702 and viewing physical object 308*b*. As shown in FIG. 8, the user is standing in front of the video monitor 308*b*. However, as can be appreciated, the user wearing headset device 102 not only sees the video monitor as it appears in the physical environment but also sees the virtual asset generated by module 108*b* and displayed by headset device 102 in the virtual environment. FIG. 9 is a diagram illustrating the user's view of the combined virtual and physical environment as displayed in XR headset device 102 when the user is at location 702, including the customized portfolio information user interface 902 as generated by XR experience generation module 108*b*.

As shown in FIG. 9, XR headset device 102 displays a user interface 902 that contains real-time stock price information for several of the stocks that are owned by the user in their retirement portfolio. The user interface 902 is also customized to include the user's first name in the greeting at the top. XR headset device 102 displays the user interface 902 in proximity to the video monitor 308*b* so that the user can view both the financial news program and their personalized stock information. Also, while the user interface 902 is partially overlapping with the video monitor 308*b*, the user interface is semi-transparent to enable the user to see the entire video monitor. As can be appreciated, the user can interact with the user interface 902 in any number of different ways. For example, the user can click and drag the user interface 902 to move it to a different location in the field of view. In another example, the user can interact with one of the ticker symbols in the user interface 902 to cause XR headset device 102 and/or XR experience generation module 108*b* to display another user interface with more detailed information about the particular company or stock.

In summary, the methods and systems described herein advantageously provide a technical solution that generates a customized, information-rich virtual experience where virtual assets and artifacts are integrated into a physical space such that the virtual assets are displayed in relation to physical objects visible to a user of an XR headset device, as the user is inhabiting or traveling within the physical space.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

The computer program can be deployed in a cloud computing environment (e.g., Amazon® AWS, Microsoft® Azure, IBM® Cloud™). A cloud computing environment includes a collection of computing resources provided as a service to one or more remote computing devices that connect to the cloud computing environment via a service account-which allows access to the aforementioned computing resources. Cloud applications use various resources that are distributed within the cloud computing environment, across availability zones, and/or across multiple computing environments or data centers. Cloud applications are hosted as a service and use transitory, temporary, and/or persistent storage to store their data. These applications leverage cloud infrastructure that eliminates the need for continuous monitoring of computing infrastructure by the application developers, such as provisioning servers, clusters, virtual machines, storage devices, and/or network resources. Instead, developers use resources in the cloud computing environment to build and run the application and store relevant data.

Method steps can be performed by one or more processors executing a computer program to perform functions of the invention by operating on input data and/or generating output data. Subroutines can refer to portions of the stored computer program and/or the processor, and/or the special circuitry that implement one or more functions. Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Exemplary processors can include, but are not limited to, integrated circuit (IC) microprocessors (including single-core and multi-core processors). Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), an ASIC (application-specific integrated circuit), Graphics Processing Unit (GPU) hardware (integrated and/or discrete), another type of specialized processor or processors configured to carry out the method steps, or the like.

Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices (e.g., NAND flash memory, solid state drives (SSD)); magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above-described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). The systems and methods described herein can be configured to interact with a user via wearable computing devices, such as an augmented reality (AR) appliance, a virtual reality (VR) appliance, a mixed reality (MR) appliance, or another type of device. Exemplary wearable computing devices can include, but are not limited to, headsets such as Meta™ Quest 3™ and Apple® Vision Pro™. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN),), a private IP network, an IP private branch exchange (IPBX), a wireless network (e.g., radio access network (RAN), Bluetooth™ near field communications (NFC) network, Wi-Fi™, WiMAX™, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), cellular networks, and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE), cellular (e.g., 4G, 5G), and/or other communication protocols.

Devices of the computing system can include, for example, a computer, a computer with a browser device, a telephone, an IP phone, a mobile device (e.g., cellular phone, personal digital assistant (PDA) device, smartphone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Safari™ from Apple, Inc., Microsoft® Edge® from Microsoft Corporation, and/or Mozilla® Firefox from Mozilla Corporation). Mobile computing devices include, for example, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The methods and systems described herein can utilize artificial intelligence (AI) and/or machine learning (ML) algorithms to process data and/or control computing devices. In one example, a classification model, is a trained ML algorithm that receives and analyzes input to generate corresponding output, most often a classification and/or label of the input according to a particular framework.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for dynamically generating and rendering custom virtual assets in a state-based extended reality (XR) journey through a physical space, the system comprising a server computing device with a memory for storing computer-executable instructions and a processor that executes the computer-executable instructions to:

identify an XR headset device worn by a user;

identify a physical environment in which the XR headset device is located, including identifying one or more physical objects arranged in defined locations in the physical environment;

generate a user-specific virtual experience for display in the XR headset device based upon one or more of: an identity of the user, an identity of the one or more physical objects, an identity of the physical environment, and a location of the XR headset device within the physical environment, wherein the user-specific virtual experience includes a virtual environment that is merged with the user's field of view of the physical environment, wherein generating the user-specific virtual experience comprises:

retrieving a pre-configured virtual experience comprising a plurality of different states corresponding to an XR journey through the physical environment, each state in the plurality of different states associated with one or more of the physical objects at defined locations in the physical environment, and customizing one or more virtual assets within the pre-configured virtual experience template based upon the identity of the user, including selecting from among a plurality of candidate virtual assets associated with a state of the plurality of different states;

capture motion attributes associated with the XR headset device;

render a virtual object in the virtual environment based at least in part on the motion attributes, the virtual object associated with at least one of the physical objects;

determine a user response to the virtual object based upon user feedback signals recorded by the XR headset device;

adapt the user-specific virtual experience based upon the user response to the virtual object, including progressing the user-specific virtual experience from a first state of the plurality of different states to a second state of the plurality of different states and modifying one or more visual aspects of the virtual environment based upon characteristics of the second state.

2. The system of claim 1, wherein the motion attributes associated with the XR headset device comprise a headset orientation, a gaze direction, a movement direction, and a movement speed.

3. The system of claim 2, wherein rendering the virtual object in the virtual environment comprises:

identifying a destination of the XR headset device within the physical environment based upon the motion attributes, the destination in proximity to a selected one of the physical objects;

estimating an amount of time for the XR headset device to reach the destination based upon the motion attributes;

calculating a maximum rendering time for each of one or more candidate virtual objects associated with the selected physical object; and rendering one of the candidate virtual objects in the virtual environment that has a maximum rendering time less than the estimated amount of time.

4. The system of claim 1, wherein rendering the virtual object in the virtual environment comprises:

generating a virtual object template associated with one of the physical objects in proximity to the XR headset device;

customizing the virtual object template based upon at least one of the identity of the user and the identity of the physical environment; and rendering a virtual object in the virtual environment using the customized virtual object template.

5. The system of claim 4, wherein generating a virtual object template comprises:

creating a prompt for generation of a virtual object template using one or more of the identity of the user, the identity of the physical object, the identity of the physical environment, and the location of the XR headset device within the physical environment;

instructing a generative artificial intelligence (AI) model to generate the virtual object template using the prompt as input; and receiving the generated virtual object template as output from the generative AI model.

6. The system of claim 1, wherein the user feedback signals recorded by the XR headset device comprise one or more of a gaze direction of the user in relation to the virtual object and/or the physical object, a gaze duration of the user in relation to the virtual object and/or the physical object, a position of the user in relation to the virtual object and/or the physical object, a movement direction of the user in relation to the virtual object and/or the physical object, a manipulation of the virtual object and/or the physical object by the user, biometric data of the user, facial expression data of the user, and speech data of the user.

7. The system of claim 6, wherein determining a user response to the virtual object based upon user feedback signals recorded by the XR headset device comprises:

generating a user interest score associated with the virtual object based at least in part upon the user feedback signals; and determining a user response to the virtual object based upon the user interest score.

8. The system of claim 1, wherein the server computing device renders the virtual object on top of the associated physical object in the user's field of view.

9. The system of claim 1, wherein modifying one or more visual aspects of the virtual environment based upon characteristics of the second state of the plurality of different states comprises rendering a new virtual object in the virtual environment based at least in part on the second state.

10. The system of claim 1, wherein the user-specific virtual experience is deemed complete when the location of the XR headset device matches a defined location in the physical environment or when the user-specific virtual experience progresses to a final state of the plurality of different states.

11. A computerized method of dynamically generating and rendering custom virtual assets in a state-based extended reality (XR) journey through a physical space, the method comprising:

identifying, by a server computing device, an XR headset device worn by a user;

identifying, by the server computing device, a physical environment in which the XR headset device is located, including identifying one or more physical objects arranged in defined locations in the physical environment;

generating, by the server computing device, a user-specific virtual experience for display in the XR headset device based upon one or more of: an identity of the user, an identity of the one or more physical objects, an identity of the physical environment, and a location of the XR headset device within the physical environment, wherein the user-specific virtual experience includes a virtual environment that is merged with the user's field of view of the physical environment, wherein generating the user-specific virtual experience comprises:

retrieving a pre-configured virtual experience comprising a plurality of different states corresponding to an XR journey through the physical environment, each state in the plurality of different states associated with one or more of the physical objects at defined locations in the physical environment, and customizing one or more virtual assets within the pre-configured virtual experience template based upon the identity of the user, including selecting from among a plurality of candidate virtual assets associated with a state of the plurality of different states;

capturing, by the server computing device, motion attributes associated with the XR headset device;

rendering, by the server computing device, a virtual object in the virtual environment based at least in part on the motion attributes, the virtual object associated with at least one of the physical objects;

determining, by the server computing device, a user response to the virtual object based upon user feedback signals recorded by the XR headset device;

adapting, by the server computing device, the user-specific virtual experience based upon the user response to the virtual object, including progressing the user-specific virtual experience from a first state of the plurality of different states to a second state of the plurality of different states and modifying one or more visual aspects of the virtual environment based upon characteristics of the second state.

12. The method of claim 11, wherein the motion attributes associated with the XR headset device comprise a headset orientation, a gaze direction, a movement direction, and a movement speed.

13. The method of claim 12, wherein rendering the virtual object in the virtual environment comprises:

identifying a destination of the XR headset device within the physical environment based upon the motion attributes, the destination in proximity to a selected one of the physical objects;

estimating an amount of time for the XR headset device to reach the destination based upon the motion attributes;

calculating a maximum rendering time for each of one or more candidate virtual objects associated with the selected physical object; and rendering one of the candidate virtual objects in the virtual environment that has a maximum rendering time less than the estimated amount of time.

14. The method of claim 11, wherein rendering the virtual object in the virtual environment comprises:

generating a virtual object template associated with one of the physical objects in proximity to the XR headset device;

customizing the virtual object template based upon at least one of the identity of the user and the identity of the physical environment; and rendering a virtual object in the virtual environment using the customized virtual object template.

15. The method of claim 14, wherein generating a virtual object template comprises:

creating a prompt for generation of a virtual object template using one or more of the identity of the user, the identity of the physical object, the identity of the physical environment, and the location of the XR headset device within the physical environment;

instructing a generative artificial intelligence (AI) model to generate the virtual object template using the prompt as input; and receiving the generated virtual object template as output from the generative AI model.

16. The method of claim 11, wherein the user feedback signals recorded by the XR headset device comprise one or more of a gaze direction of the user in relation to the virtual object and/or the physical object, a gaze duration of the user in relation to the virtual object and/or the physical object, a position of the user in relation to the virtual object and/or the physical object, a movement direction of the user in relation to the virtual object and/or the physical object, a manipulation of the virtual object and/or the physical object by the user, biometric data of the user, facial expression data of the user, and speech data of the user.

17. The method of claim 16, wherein determining a user response to the virtual object based upon user feedback signals recorded by the XR headset device comprises:

generating a user interest score associated with the virtual object based at least in part upon the user feedback signals; and determining a user response to the virtual object based upon the user interest score.

18. The method of claim 11, wherein the server computing device renders the virtual object on top of the associated physical object in the user's field of view.

19. The method of claim 11, wherein modifying one or more visual aspects of the virtual environment based upon characteristics of the second state of the plurality of different states comprises rendering a new virtual object in the virtual environment based at least in part on the second state.

20. The method of claim 11, wherein the user-specific virtual experience is deemed complete when the location of the XR headset device matches a defined location in the physical environment or when the user-specific virtual experience progresses to a final state of the plurality of different states.

* * * * *